United States Patent [19]

Fujita

[11] Patent Number: 5,018,883
[45] Date of Patent: May 28, 1991

[54] VECTOR FONT PROCESSING IN A PRINTING DEVICE

[75] Inventor: Yutaka Fujita, Shizuoka, Japan
[73] Assignee: Tokyo Electric Co., Ltd., Tokyo, Japan
[21] Appl. No.: 340,852
[22] Filed: Apr. 20, 1989
[30] Foreign Application Priority Data Apr. 27, 1988 [JP] Japan ................ 63-104871

[51] Int. Cl.⁵ .................................... B41J 5/30
[52] U.S. Cl. ............................ 400/121; 340/731; 340/735; 340/790; 340/739
[58] Field of Search ............. 340/727, 730, 739, 735, 340/747, 748, 790, 731, 732; 400/121

[56] References Cited

U.S. PATENT DOCUMENTS

| | | | |
|---|---|---|---|
| 4,283,724 | 8/1981 | Edwards | 340/790 |
| 4,511,267 | 4/1985 | Pokorny | 400/121 |
| 4,566,002 | 1/1986 | Miura et al. | 340/727 |
| 4,591,846 | 5/1986 | Koos | 340/731 |
| 4,633,243 | 12/1986 | Bresenham | 340/748 |
| 4,646,077 | 2/1987 | Culley | 340/735 |
| 4,660,028 | 4/1987 | Yu | 340/732 |
| 4,686,525 | 8/1987 | Nagata | 340/735 |
| 4,694,405 | 9/1987 | Bradbury et al. | 364/518 |
| 4,742,344 | 5/1988 | Nakagawa | 340/790 |
| 4,785,391 | 11/1988 | Apley | 340/720 |
| 4,794,389 | 12/1988 | Luck | 340/747 |

Primary Examiner—David A. Wiecking
Assistant Examiner—Steven S. Kelley
Attorney, Agent, or Firm—Frishauf, Holtz, Goodman & Woodward

[57] ABSTRACT

A printing device comprises a page memory and a printing section. The printing device further comprises a font stack memory and a control circuit. The font stack memory stores the combination of the character code and the attribute information corresponding to a bit map font stored in the page memory, together with the coordinate information identifying that area of the page memory in which the bit map font is stored. The control circuit receives a series of character codes together with attribute information and layout information, and checks whether or not each character code is registered in the font stack memory together with the attribute information allotted to the character code. When it is detected that the combination of the character code and the attribute information is registered, the control circuit reads out the bit map font from that memory area of the page memory which is identified by the coordinate information registered together with the combination of the character code and the attribute information, and stores the readout bit map font into that area of the page memory which is specified by the layout information allotted to the character code and the order of the character code. The printing section prints a printing pattern constituted by the bit map fonts stored in the page memory according to the series of the character codes.

7 Claims, 2 Drawing Sheets

VECTOR FONT PROCESSING IN A PRINTING DEVICE

BACKGROUND OF THE INVENTION

1. Field of the Invention

This invention relates to a printing device for performing the printing operation for each page.

2. Description of the related art

In an ordinary page printer, an printing pattern is formed based on control data of one page supplied from an external host computer and a printing section is driven according to the printing pattern. The control data of one page includes character codes for specifying characters (numeral or symbol), attribute information for specifying the style, height and rotation of the character, and layout information for specifying the size of printing paper, a vertical motion index corresponding to the number of pitches of a line space and a horizontal motion index corresponding to the number of pitches between characters. The layout information and attribute information are used when it is required to change the contents of the specified printing conditions.

The conventional page printer includes a working RAM, a vector font memory, and a page memory to form a printing pattern. The working RAM is used to temporarily store control data of one page, various operation data and the like, and the vector font memory is used to previously store various vector fonts for representing various characters in the vector form. Further, the page memory is used to store bit map fonts representing various characters in the dot matrix form.

In forming the printing pattern, the working RAM and page memory are first initialized, and then control data is received. The control data is stored in the working RAM, and then it is checked whether or not the control data is the character code. When it is detected that the control data is the character code, the vector font memory is searched for the vector font of a character corresponding to the character code, and the vector font is read out from the vector font memory into the working RAM. Then, the vector font is subjected to the processing operation specified by the attribute information allotted to the character code so as to be converted or developed into a corresponding bit map font. The bit map font thus obtained is stored into that area of the page memory which is specified by the reception order of the character code and the layout information allotted to the character code. The printing pattern is formed by converting or developing the vector font corresponding to character codes of one page into the bit map font and storing the bit map font into the page memory.

The processing operation for converting the vector font into the bit map font generally includes 3-order floating decimal point multiplication, operation of trigonometric function, 2-dimensional matrix operation, operation for blackening the internal area of the font character, and the like. Since the processing operations are effected for all the vector fonts corresponding to the character codes of one page, a relatively long time is required to effect the processing operations. Therefore, it is impossible to start the printing operation immediately after the control data is received in the conventional page printer.

The method of converting the vector font into the bit map font is disclosed in the article by Foley and Van Dam, "Fundamentals of Interactive Computer Graphics", Addison Wesley Co. 1982, ISDN U-201-14468-9.

SUMMARY OF THE INVENTION

An object of this invention is to provide a printing device capable of shortening the printing preparation time.

The above object can be attained by a printing device comprising a text memory for storing a series of character codes externally supplied and attribute information and layout information corresponding to the character codes; a vector font memory for storing a plurality of vector fonts representing various characters in the vector form; a font stack memory; a printing memory; a printing section; and control means for sequentially reading out the character codes from the text memory, checking whether or not each character code is registered in the font stack memory together with the attribute information allotted to the readout character code, reading out a vector font corresponding to the checked character code from the vector font memory when it is detected that a combination of the checked character code and the allotted attribute information is not registered, converting the readout vector font into a corresponding bit map font representing the character in the dot matrix form by processing the vector font based on the attribute information allotted to the character code, storing the converted bit map font into that area of the printing memory which is specified by the layout information allotted to the checked character code and the reception order of the checked character code and registering the checked character code into the font stack memory together with the attribute information allotted to the character code and coordinate information identifying the memory area of the printing memory in which the bit map font is stored; and reading out the bit map font from that memory area of the printing memory which is identified by the coordinate information registered together with the combination of the checked character code and the attribute information allotted thereto when it is detected that the combination of the checked character code and the allotted attribute information is registered, storing the readout bit map font into that area of the printing memory which is specified by the layout information allotted to the checked character code and the order of the checked character code, and causing the printing section to print the printing pattern constituted by the bit map fonts stored in the printing memory according to the series of the character codes.

With the above printing device, the contents of the font stack memory are checked prior to the processing operation of forming the bit map font based on the character code and attribute information. In a case where a combination of the character code and attribute information is novel, a bit map font is formed by using the processing operation specified by the character code and attribute information and stored into a memory area of the printing memory. At the same time, coordinate information identifying the memory area of the printing memory is registered in the font stack memory together with the character code and attribute information. When a combination of the character code and attribute information is not novel, or when the combination is already registered in the font stack memory, a desired bit map font is read out from that memory area of the printing memory which is identified by the coordinate information registered together with the character code and attribute information and is copied in the other memory area of the printing memory. Therefore, if a desired bit map font is once formed by the processing operation, the processing operation for forming the bit map font can be omitted. In this way, the printing preparation time of the printing device can be shortened.

DETAILED DESCRIPTION OF THE PREFERRED EMBODIMENTS

Figure 1:
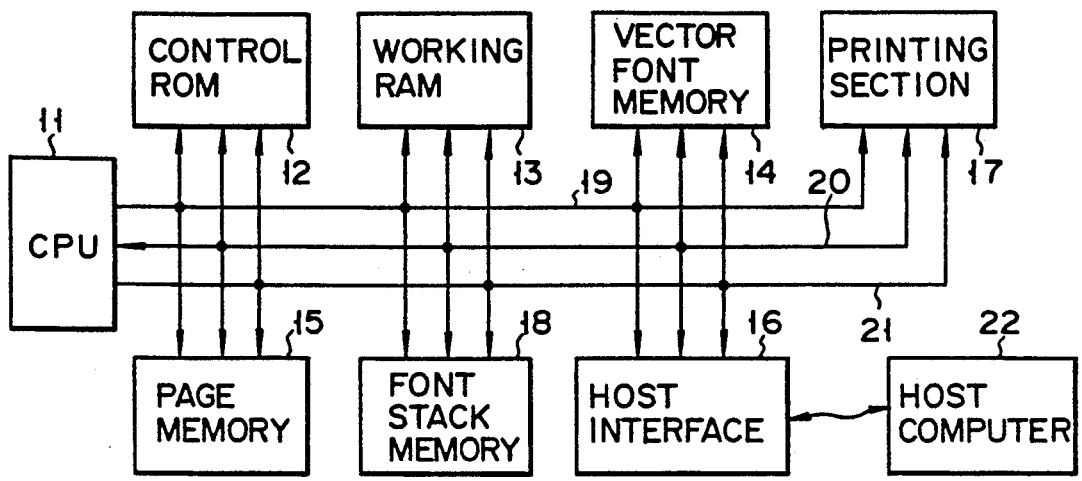
FIG. 1 is a circuit diagram showing a printing device according to one embodiment of this invention.
Figure 2:
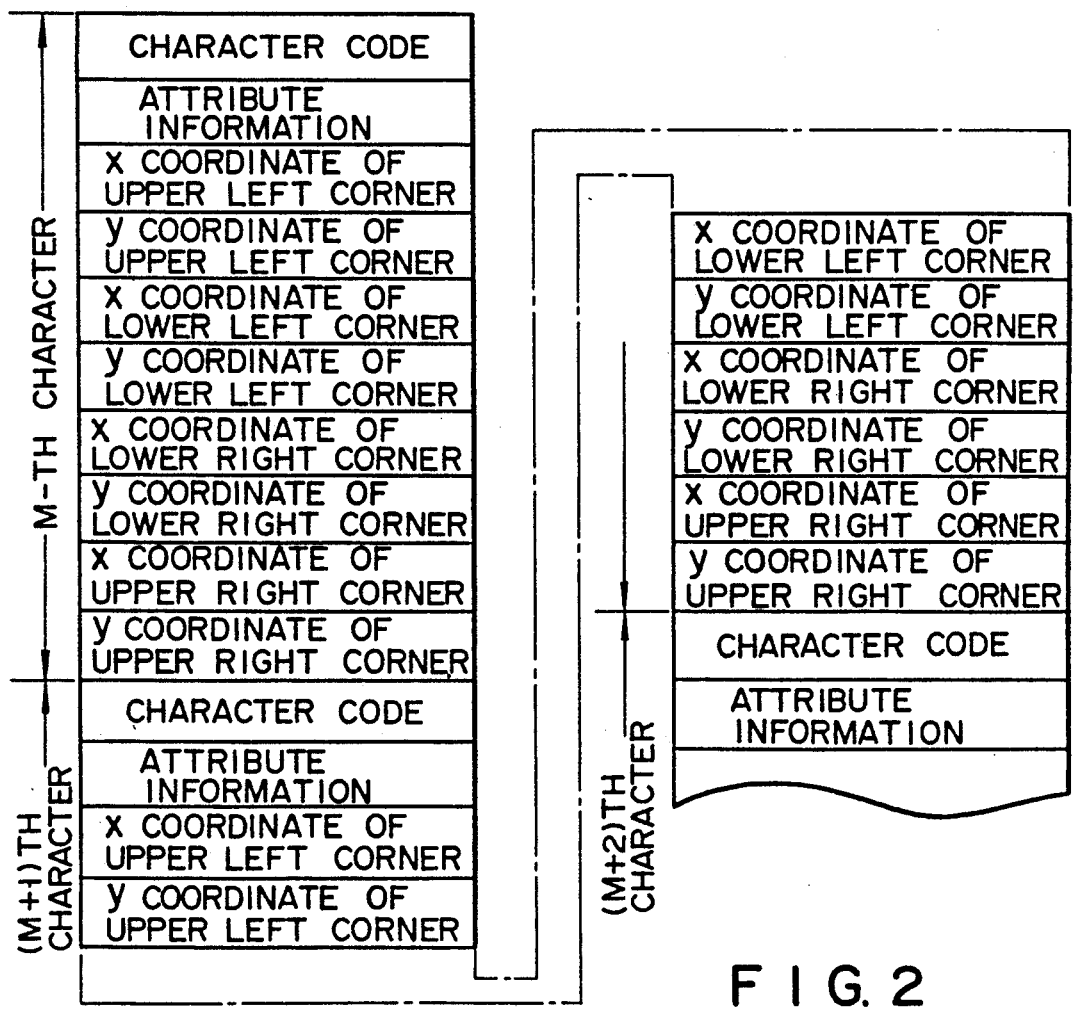
FIG. 2 is a diagram showing the internal structure of a font stack memory in FIG. 1.

There will now be described a printing device according to one embodiment of this invention with reference to FIGS. 1 to 3. FIG. 1 is a circuit diagram of the printing device. The printing device includes CPU 11, control ROM 12, working RAM 13, vector font memory 14, page memory 15, host interface 16, printing section 17 and font stack memory 18. The above circuit elements are connected to each other via address bus line 19, data bus line 20 and control bus line 21. Further, host interface 16 is connected to external host computer 22.

CPU 11 is used to control the printing operation of the printing device, and ROM 12 is used to store the control program of CPU 11. Further, RAM 13 is used to temporarily store input/output data of CPU 11. CPU 11 reads out and executes the control program from ROM 12 to effect the printing operation. In the printing operation, a printing pattern is formed based on control data of one page supplied from host computer 22, and printing section 17 is driven according to the printing pattern. The control data of one page includes character codes specifying characters (numerals, symbols or the like), attribute information for specifying the style, height, rotation and the like of characters, and layout information for specifying the paper size, a vertical motion index corresponding to the number of pitches of the line space, and a horizontal motion index corresponding to the number of pitches between characters. The attribute information and layout information are added when it becomes necessary to change previously determined contents. Vector font memory 14 is used to store various vector fonts for representing various characters in the vector form, page memory 15 is used to store bit map fonts of one page representing characters in the dot matrix form as a printing pattern, and font stack memory 18 is used to store character codes and attribute information corresponding to the bit map font stored in the memory area of page memory 15 together with the coordinate information indicating the memory area of page memory 15. The coordinate information is constituted by x and y coordinates corresponding to the four corners of the bit map font. FIG. 2 shows the internal construction of font stack memory 18. In font stack memory 18, a memory area of 10 words is allotted for each bit map font of one character, and the character code, the attribute information, the x coordinate of the upper left corner, the y coordinate of the upper left corner, the x coordinate of the lower left corner, the y coordinate of the lower left corner, the x coordinate of the lower right corner, the y coordinate of the lower right corner, the x coordinate of the upper right corner, and the y coordinate of the upper right corner are sequentially stored into the 10-word memory areas.

Figure 3:
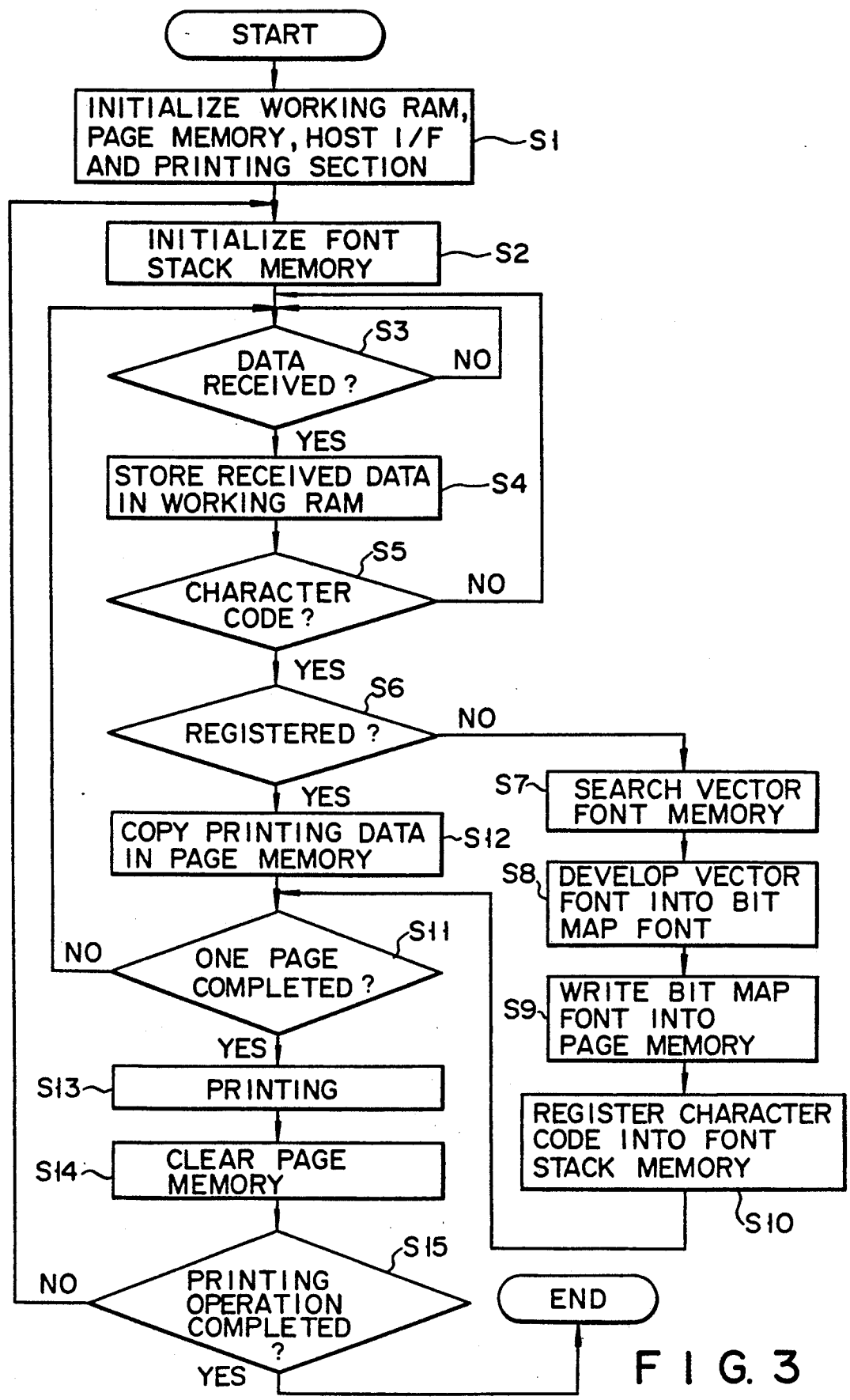
FIG. 3 is a flowchart showing the printing operation of the printing device shown in FIG. 1.

FIG. 3 is a flowchart showing the printing operation of the printing device. When the process of the flowchart is started, working RAM 13, page memory 15, host interface 16 and printing section 17 are initialized in step S1, and then font stack memory 18 is initialized in step S2. After this, control data is received in step S3, and stored in working RAM 13 in step S4. When the control data is read out from working RAM 13 and it is detected in step S5 that the control data is a character code, it is checked in step S6 whether or not the character code is registered in font stack memory 18 together with attribute information allotted to the character code. When it is detected that a combination of the character code and the attribute information allotted thereto is not registered, vector font memory 14 is searched for the vector font of a character corresponding to the character code in step S7 and the vector font is read out from vector font memory 14 and stored in working RAM 13. After this, the readout vector font is subjected to a processing operation such as enlargement, reduction and rotation processes based on the attribute information allotted to the character code so as to be converted or developed into a corresponding bit map font. The bit map font is stored in that area of page memory 15 which is specified by the layout information allotted to the character code and the reception order of the character code in step S9. In step S10, the character code is registered into font stack memory 18 together with the attribute information allotted to the character code and the coordinate information indicating the area of page memory 15 in which the bit map font is stored. Then, in step S11, it is checked whether or not all the bit map fonts corresponding to the character codes of one page are stored in page memory 15. If "no" in step S11, step S3 is effected again.

If it is detected in step S6 that the above-mentioned combination of the character code and the allotted attribute information is registered, the bit map font is read out from that area of page memory 15 which is specified by the coordinate information registered together with the bit map font in font stack memory 18 in step S12. Then, the bit map font is stored in the memory area determined by the layout information allotted to the character code and the reception order of the character code. In this way, a desired bit map font in an area of page memory 15 is copied and stored in another area of page memory 15, and then step S11 is effected.

When the bit map fonts of one page is completely stored in page memory 15, printing section 17 is driven in step S13 according to the contents of page memory 15 to print a printing pattern created by bit map fonts of one page on printing paper. After completion of the printing operation, page memory 15 is cleared in step S14. In step S15, it is checked whether or not the printing operation should be continued. In a case where the printing operation is continued, step S2 is effected again so as to effect the printing operation for the next page. In contrast, when the printing operation is completed, the operation is terminated.

In the printing device according to the above embodiment of this invention, when the character code is received, it is checked whether or not the character code is registered in font stack memory 18 together with the attribute information allotted to the character code. In this case, if a combination of the character code and the allotted attribute information is registered, the bit map font is read out from the memory area of page memory 15 which is specified by the coordinate information registered together with the character code and the allotted attribute information in font stack memory 18. That is, in a case where a desired bit map font is previously formed and stored in page memory 15, the operation of obtaining the bit map font by reading out a vector font corresponding to the character code from vector font memory 14 and processing the readout bit map font based on the attribute information can be omitted. Thus, the printing preparation time of the page printer can be shortened in comparison with the conventional case.

In the above embodiment, the character code, attribute information and layout information are transferred as control data from the host computer to the printing device. However, it is also possible to prepare the attribute information and layout information in the printing device.

Further, the process of forming the bit map font may be effected after the control data of one page has been successively received and stored in working RAM 13.

What is claimed is:

1. A printing device, comprising:
   input means for inputting character codes and attribute information items allotted to the character codes;
   printing memory means for storing bit map fonts, each determined by a combination of a character code and an attribute information item input from said input means;
   font stack memory means for storing combinations of character codes and attribute information items, corresponding to the bit map fonts stored in said printing memory means, with coordinate information items attached to the respective combinations of character codes and attribute information items and indicating the areas of said printing memory means at which said bit map fonts are located;
   printing means for printing a printing pattern constituted by the bit map fonts stored in said printing memory means;
   font memory means for storing a plurality of vector fonts; and
   processing means for checking whether or not a combination of a character code and an attribute information item, identical to a combination of a character code and attribute information item input from said input means, is registered in said font stack memory means;
   said processing means including means for selecting one of the vector fonts stored in said font memory means in accordance with an input character code, converting the selected vector font into a bit map font corresponding to the input attribute information item, storing the converted bit map font in an area of said printing memory means, and for registering a combination of character code and attribute information item in said font stack memory means with the coordinate information corresponding to the stored bit map font, when it is detected that an identical combination of character code and attribute information item has not been registered; and
   said processing means including means for reading a bit map font from that area of said printing memory means which is specified by the coordinate information item attached to the identical combination of character code and attribute information item, and for storing the readout bit map font into another area of said printing memory means when it is detected that the identical combination has been registered.

2. A printing device according to claim 1, wherein said input means includes an input section for inputting layout information in addition to said character codes and attribute information items.

3. A printing device according to claim 2, wherein said input means includes a text memory for storing the character codes, attribute information items, and layout information sequentially supplied from said input section.

4. A printing device according to claim 3, wherein said processing means includes means for storing the bit map font in that area of said printing memory means which is specified by the input layout information and the order of the input character code.

5. A printing device according to claim 3, wherein said input means is connected to a host computer which generates the character codes, attribute information items, and layout information.

6. A printing device according to claim 1, wherein said input means is connected to a host computer which generates the character codes.

7. A printing device according to claim 1, wherein said printing means has a page memory for storing a printing pattern constituted by bit map fonts for one page.

* * * * *